United States Patent
Kluge et al.

(10) Patent No.: US 7,295,810 B2
(45) Date of Patent: Nov. 13, 2007

(54) WLAN HEADER DETECTION IN ANALOG RADIO FRONT END

(75) Inventors: Wolfram Kluge, Dresden (DE);
Thomas Hanusch, Coswig (DE);
Matthias Tänzer, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 760 days.

(21) Appl. No.: 10/816,682

(22) Filed: Apr. 2, 2004

(65) Prior Publication Data

US 2005/0135290 A1    Jun. 23, 2005

(30) Foreign Application Priority Data

Dec. 23, 2003  (DE)  ............... 103 60 931

(51) Int. Cl.
*H04B 7/00* (2006.01)
*H04Q 7/20* (2006.01)

(52) U.S. Cl. .................. 455/41.2; 455/426.1; 455/518; 455/550.1; 370/315

(58) Field of Classification Search .............. 455/414.1, 455/403, 405, 446, 41.2, 463, 518, 519, 550.1, 455/426.1; 370/315, 319, 332
See application file for complete search history.

(56) References Cited

U.S. PATENT DOCUMENTS

| | | |
|---|---|---|
| 5,802,101 A | 9/1998 | Maruyama |
| 6,031,833 A | 2/2000 | Fickes et al. |
| 6,069,887 A | 5/2000 | Geiger et al. |

*Primary Examiner*—Tony T. Nguyen
(74) *Attorney, Agent, or Firm*—Meyertons Hood Kivlin Kowert & Goetzel, P.C.; B. Noël Kivlin

(57) ABSTRACT

A header detection technique for WLAN (Wireless Local Area Network) receivers is provided. The WLAN receiver comprises a signal processing unit that has analog circuitry and digital circuitry. There is further provided a header detection circuit for detecting a header in a received signal. The header detection circuit is comprised in the analog circuitry. In an embodiment, digital circuitry may be woken up based on a header detect signal that is generated by the header detection circuit. The embodiments may reduce the power consumption of the receiver, and the false detection rate.

39 Claims, 7 Drawing Sheets

WLAN HEADER DETECTION IN ANALOG RADIO FRONT END

BACKGROUND OF THE INVENTION

1. Field of the Invention

The present application relates to WLAN (Wireless Local Area Network) receivers and corresponding methods and integrated circuit chips, and in particular to the header detection in such receivers.

2. Description of the Related Art

A wireless local area network is a flexible data communications system implemented as an extension to or as an alternative for, a wired LAN. Using radio frequency or infrared technology, WLAN systems transmit and receive data over the air, minimizing the need for wired connections. Thus, WLAN systems combine data connectivity with user mobility.

Today, most WLAN systems use spread spectrum technology, a wide-band radio frequency technique developed for use in reliable and secure communication systems. The spread spectrum technology is designed to trade-off bandwidth efficiency for reliability, integrity and security. Two types of spread spectrum radio systems are frequently used: frequency hopping and direct sequence systems.

The standard defining and governing wireless local area networks that operate in the 2.4 GHz spectrum, is the IEEE 802.11 standard. To allow higher data rate transmissions, the standard was extended to 802.11b that allows data rates of 5.5 and 11 Mbps in the 2.4 GHz spectrum. Further extensions exist.

Examples of these extensions are the IEEE 802.11a, 802.11b and 802.11g standards. The 802.11a specification applies to wireless ATM (Asynchronous Transfer Mode) systems and is used in access hubs. 802.11a operates at radio frequencies between 5 GHz and 6 GHz. It uses a modulation scheme known as Orthogonal Frequency Division Multiplexing (OFDM) that makes possible data speeds as high as 54 Mbps, but most commonly, communications take place at 6 Mbps, 12 Mbps, or 24 Mbps. The 802.11b standard uses a modulation method known as Complementary Code Keying (CCK) which allows high data rates and is less susceptible to multi-path propagation interference. The 802.11g standard can use data rates of up to 54 Mbps in the 2.4 GHz frequency band using OFDM. Since both 802.11g and 802.11b operate in the 2.4 GHz frequency band, they are completely inter-operable. The 802.11g standard defines CCK-OFDM as optional transmit mode that combines the access modes of 802.11a and 802.11b, and which can support transmission rates of up to 22 Mbps.

In any transmit mode, a WLAN receiver needs to detect the headers in the received signals. For this purpose, conventional WLAN receivers convert the incoming analog signals to digital signals and perform some digital signal processing on the converted signals to detect the headers. This is an approach which has been shown to usually work properly, but under certain circumstances, the conventional header detection schemes are of insufficient precision and accuracy and work sometimes inefficiently. Moreover, the power consumption involved with detecting headers in conventional receivers is rather high.

SUMMARY OF THE INVENTION

An improved header detection technique for WLAN receivers is provided that may overcome the disadvantages of the conventional approaches.

In one embodiment, a WLAN receiver for receiving incoming radio signals is provided. The WLAN receiver comprises a signal processing unit for processing received signals. The signal processing unit comprises analog circuitry for performing analog signal processing, and digital circuitry for performing digital signal processing. The signal processing unit further comprises a header detection circuit for detecting a header in a received signal. The analog circuitry comprises the header detection circuit.

According to another embodiment, an integrated circuit chip is provided for processing signals received by a WLAN receiver. The integrated circuit chip comprises analog circuitry for performing analog signal processing, and digital circuitry for performing digital signal processing. The integrated circuit chip further comprises a header detection circuit for detecting a header in a received signal. The analog circuitry comprises the header detection circuit.

In a further embodiment, there is provided a method of operating a WLAN receiver for processing incoming radio signals. The method comprises performing analog signal processing, and performing digital signal processing. The method further comprises detecting a header in a received signal. Performing the analog signal processing comprises the header detection.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Figure 1:
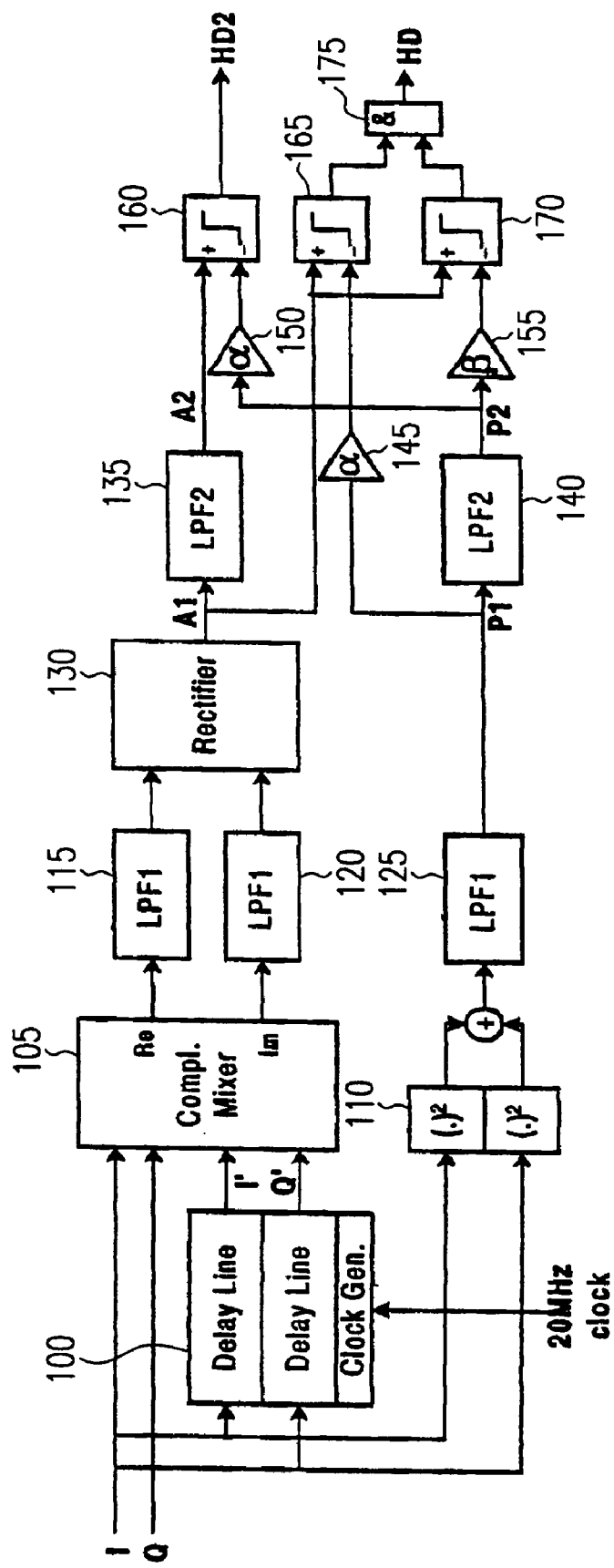
FIG. 1 is a block diagram illustrating a header detection unit according to an embodiment.

Referring now to the figures and particularly to FIG. 1, a header detection unit according to an embodiment is provided. The header detection circuit is implemented by analog circuitry and is based on autocorrelation of the received signal. The header detection unit of FIG. 1 is adapted to detect OFDM headers that consist of ten short symbols each 0.8 µs long. The header detection unit exploits this repetitive signal structure to detect the header and distinguish it from other signals.

A delay line 100 is provided to sample the I/Q baseband signals with a 20 MHz sampling rate and store the sampled signal values for 0.8 µs. After that time, the sampled signal values are switched to the delay line output.

A complex mixer 105 is provided that may consist of four mixer blocks. The output signals of the complex mixer 105 represent the complex valued autocorrelation signal that may be calculated as follows:

$$(I+jQ)(I'-jQ')=II'+QQ'+j(QI'-IQ')$$

where I' and Q' are the delayed signals. It is to be noted that the delayed I'+jQ' is treated as conjugate signal.

The calculation of the autocorrelation signal is then followed by an integration which makes use of low pass filters 115 and 120.

The filtered signals are provided to a rectifier 130 that calculates the magnitude A1 of the complex valued input signal. This may be described to be approximately done by summing the absolute values of the real and imaginary parts:

$$A1=|Re()|+|Im()|$$

A second low pass filter (LPF2) 135 provides an additional autocorrelation signal A2. The low pass filter 135 has a longer integration time than the low pass filters 115, 120.

As a reference for the comparators 160, 165, 170, power signals P1 and P2 are generated. The reference path uses the same low pass filters (LPF1 and LPF2) 125, 140 as the autocorrelation signal path. It is to be noted that the autocorrelation signal and the power signals of the present embodiment are proportional to the squared baseband signal magnitude. This allows for making the comparator decision independent from the signal amplitude.

As can be seen from FIG. 1, a header detect signal HD is generated when the output signals of the two comparators 165, 170 are high.

The comparator 165 compares the autocorrelation signal A1 with the power signal P1 that is weighted by a constant scaling factor a by scaling unit 145. Both signals may have the same amplitude (when neglecting noise), so the factor a may be chosen to be less than 1. The header detection is therefore based on the criterion that $$A1 \geq \alpha \cdot P1.$$

The LPF1 cut-off frequency may be set to a value where the delay of the comparator output referred to the header start is about 1.6 µs. This delay may vary with the Signal-to-Noise Ratio (SNR). As this time constant may provide insufficient noise peak smoothing so that the comparator output hits about once in a millisecond, a further criterion may be used to suppress this kind of noise-caused false detection.

According to this further criterion, the comparator output is validated by further comparing the autocorrelation signal A1 to the power signal P2 that is averaged by low pass filter 140 using a longer time constant. The low pass filter 140 may also provide an additional delay of the power signal. Therefore, the autocorrelation signal A1 is compared to the noise power that was present before the header signal appeared. To exceed the threshold, the baseband signal energy is chosen to be slightly higher than the noise power. In the present embodiment, the SNR is chosen to be about 2.5 dB to meet this criterion.

A further validation of the HD signal may be achieved by comparing the longer averaged signals A2 and P2. The same weighting factors a may be used here to scale the power signal P2 by scaling unit 150. Due to the longer time constant of LPF2, the delay may be in the range of 4 µs to 6 µs. Therefore, the comparator 160 provides a second header detect signal HD2 that may be too late to start the AGC (Automatic Gain Control). Nevertheless, the signal HD2 may be used to reset the AGC in case it is not high a certain time after the HD signal hit.

In the present embodiment, the scaling factors $\alpha$ and $\beta$ used in scaling units 145, 150, 155 are chosen to be $\alpha=0.5$ and $\beta=1.0$.

Figure 2:
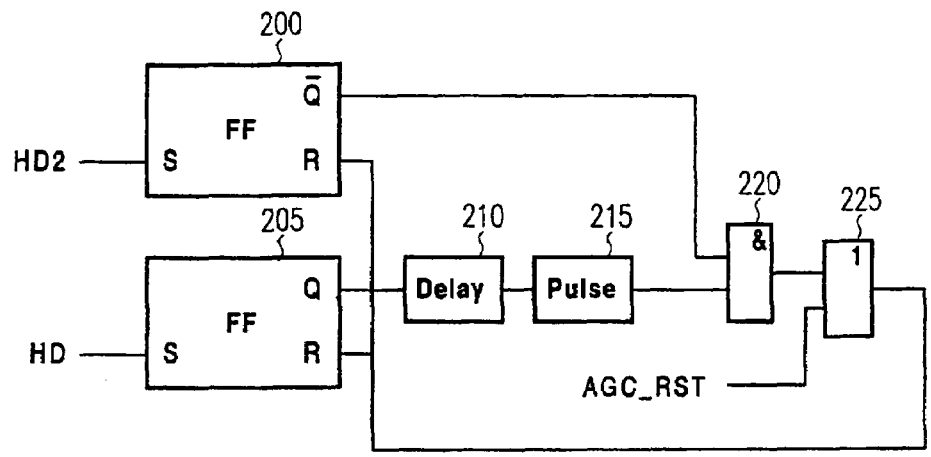
FIG. 2 is a block diagram illustrating a signal latching unit to latch output signals of the header detection unit of FIG. 1, according to an embodiment.

The header detection signals HD and HD2 that are generated by the header detection unit of FIG. 1 or any other embodiment, may be latched by the circuit shown in FIG. 2.

The signal latching unit of FIG. 2 comprises two RS flip-flop devices 200, 205 each receiving one of the header detect signals at an S terminal. The latched HD signal is then delayed by unit 210 by $T_{HD2}$. From the rising edge of the delayed signal, an auto-reset pulse is generated if the latched HD2 signal is low. The value of $T_{HD2}$ may be a delay time of 8 µs to verify the HD2 signal.

Figure 3:
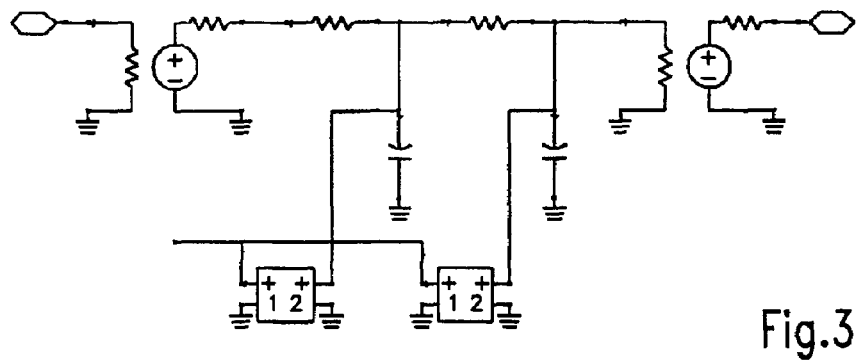
FIG. 3 is a schematic circuit diagram illustrating an implementation of the low pass filter LPF1 used in the header detection unit of FIG. 1, according to an embodiment.
Figure 4:
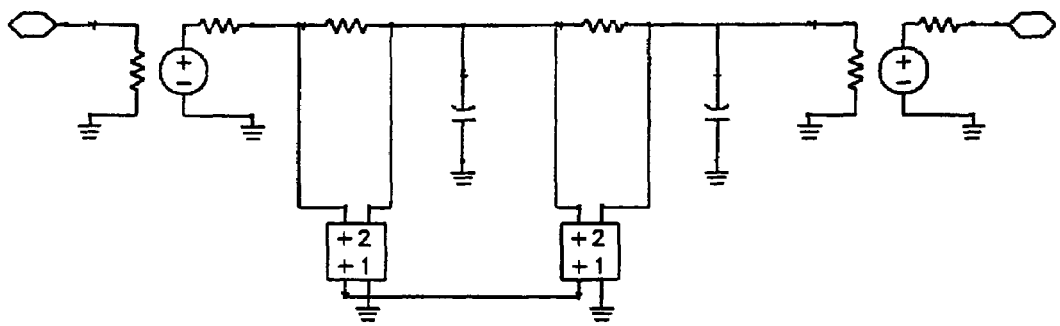
FIG. 4 is a schematic circuit diagram illustrating an implementation of the low pass filter LPF2 used in the header detection unit of FIG. 1, according to an embodiment.

FIGS. 3 and 4 illustrate schematic circuit diagrams of the low pass filters LPF1 (FIG. 3) and LPF2 (FIG. 4). As may be seen from the figures, the low pass filters are second order filters comprising two real poles. This was found to be a good compromise between low group delay and low cut-off frequency. In the filters of FIGS. 3 and 4, the cut-off frequency ratio is chosen to be 4.667. It is further to be noted that the low pass filters of FIGS. 3 and 4 are implemented without any amplifiers.

Figure 5B:
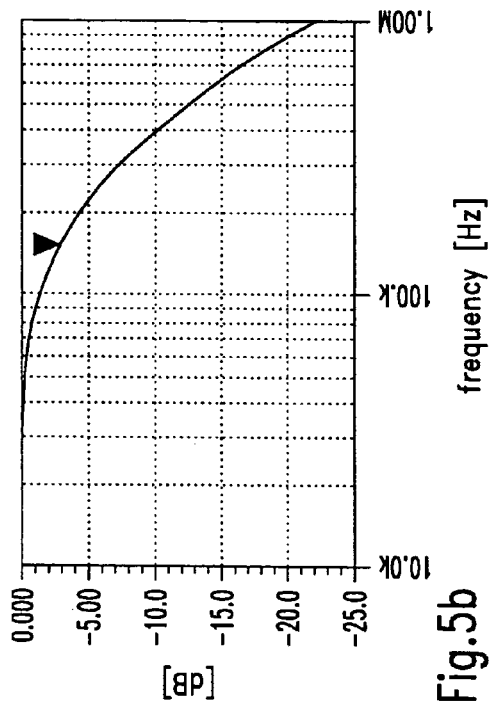
FIG. 5b illustrates the frequency characteristic of low pass filter LPF1.
Figure 6B:
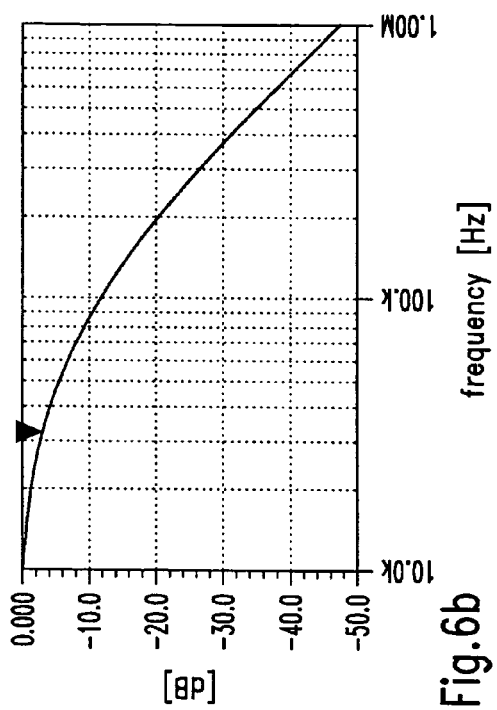
FIG. 6b illustrates the frequency characteristic of low pass filter LPF2.
Figure 5A:
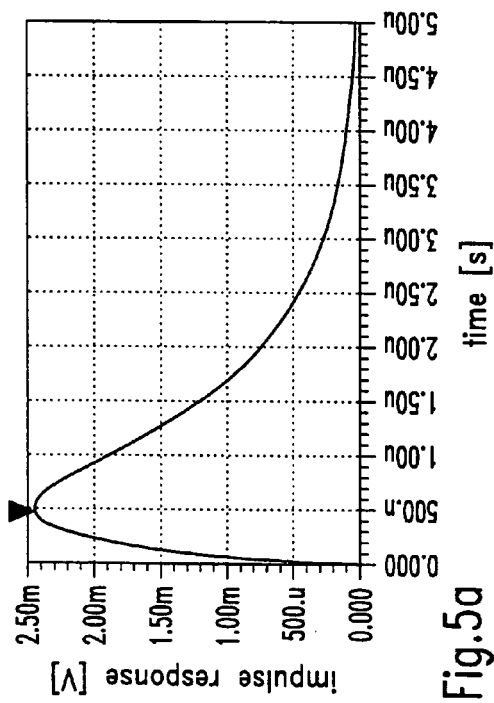
FIG. 5a illustrates the impulse response of low pass filter LPF1.
Figure 6A:
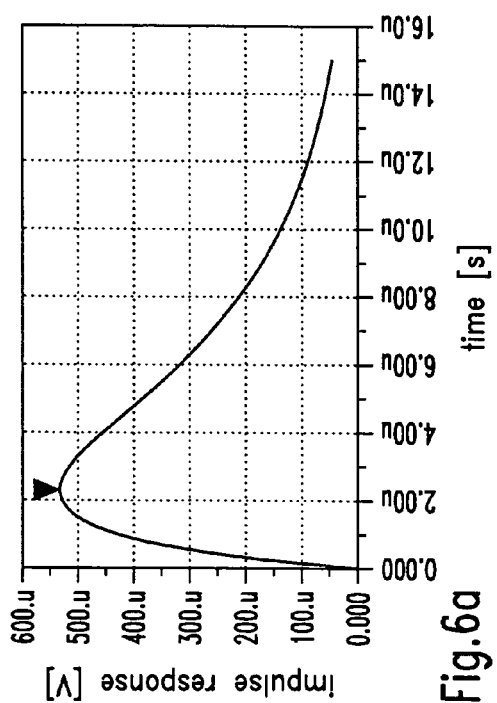
FIG. 6a illustrates the impulse response of low pass filter LPF2.

FIGS. 5a and 6a illustrate the impulse response of low pass filters LPF1 and LPF2 shown in FIGS. 3 and 4, respectively. FIGS. 5b and 6b illustrate the corresponding frequency characteristics.

The low pass filters LPF1 and LPF2 may be reset. LPF1 reset may be achieved by zeroing the capacity voltage. LPF2 reset in the same way would lead to a long sampling time of about 10 µs until the output voltage represents the average noise input voltage. To reduce this settling time, the resistors may be shorted for a time duration of about 2 µs after AGC reset. During this time, the capacitors are pre-charged at the output voltage of LPF1 which is a good starting point for the long averaging.

A header detection unit reset may be performed at AGC reset, for example when switching on the AGC or when resetting the receiver after a successful read process, and at a mode switch from the PLL (Phase Locked Loop) mode to the transceiver mode (which is usually a receiver mode).

Figure 7:
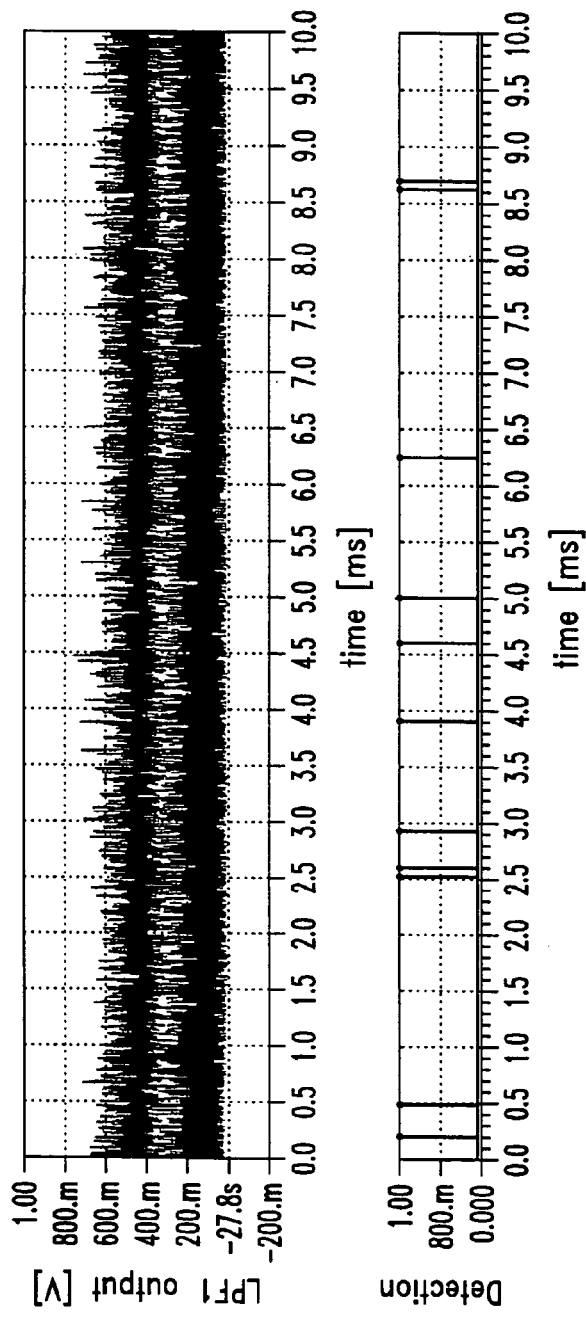
FIG. 7 illustrates the autocorrelation and power signal after low pass filter LPF1.
Figure 8:
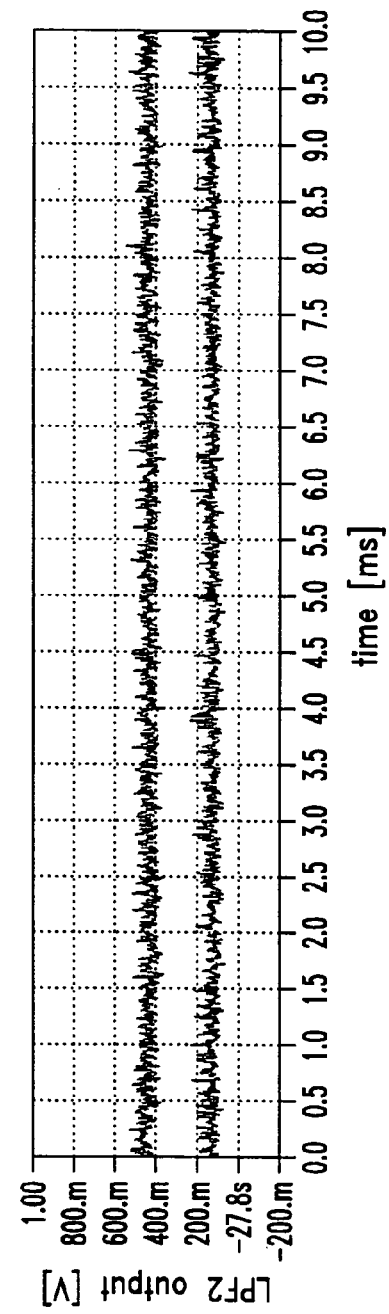
FIG. 8 illustrates the autocorrelation and power signal after low pass filter LPF2.

To illustrate the performance of header detection, FIGS. 7 and 8 illustrate the results of a simulation. As will be described in the following, this simulation shows that the use of more than one comparator 160, 165, 170 in the arrangement shown in FIG. 1 may improve the header detection by reducing false detections.

In the simulation, the input signal is chosen to be noise of 10 ms duration. The header signal starts at 9990 μs to see a single header detection cycle.

FIG. 7 shows the noise after the LPF1 blocks 115, 120. It can be seen that both noise signals overlap so that the comparison A1>α·P1 indicates false header detection, which is shown in the lower graph. This occurs approximately once per millisecond. In this case, the low pass filter cut-off frequency was chosen to be 140 kHz.

Further simulations with reduced cut-off frequencies showed that there were no false detection within 10 ms for cut-off frequencies below 100 kHz (assuming the same filter schematic).

FIG. 8 shows the signals A2, P2 at the output of both low pass filters LPF2. It can be seen that the distance is large enough to make a safe decision. In this case, the low pass filter cut-off frequency was set to 31 kHz.

Figure 9:
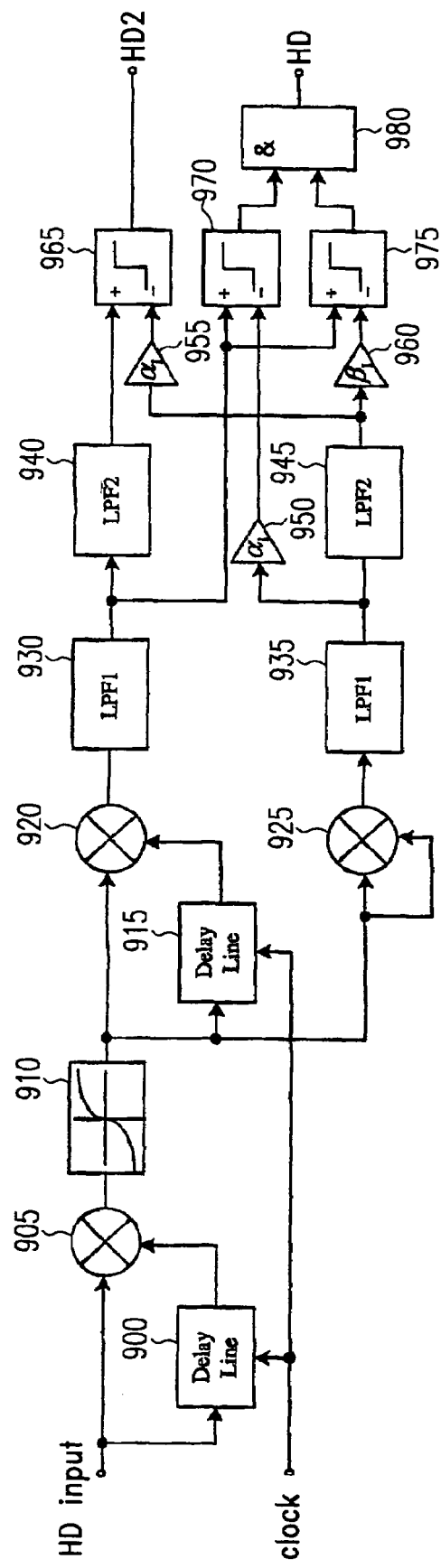
FIG. 9 is a block diagram illustrating a header detection unit for CCK header detection of bandpass signals according to an embodiment.
Figure 10:
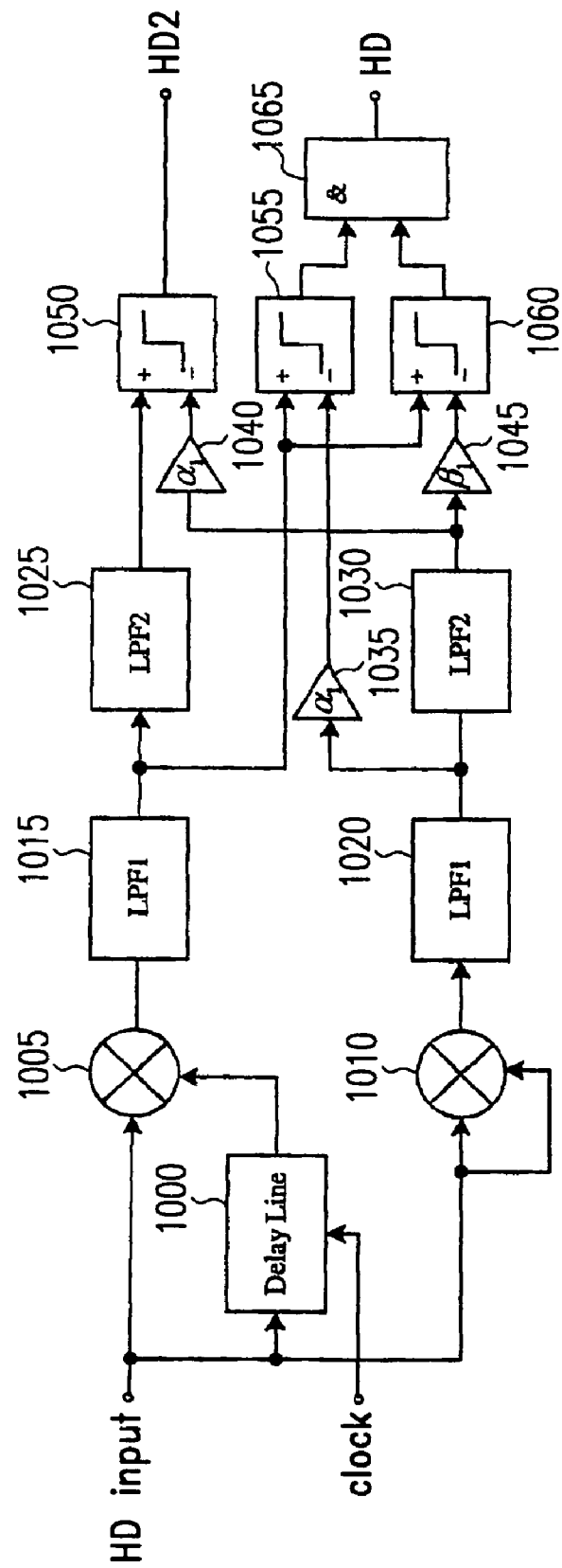
FIG. 10 is a block diagram illustrating a header detection unit for OFDM header detection of bandpass signals according to an embodiment.

Referring now to FIGS. 9 and 10, bandpass signal versions for CCK and OFDM header detection are depicted according to an embodiment. As can be seen from FIG. 9, two autocorrelation stages 900, 905 and 915, 920 are provided that each comprise a delay line 900, 915 and a mixer 905, 920. A non-linear signal transformer 910 may be provided between the stages to provide some signal saturation or limiting.

Figure 11:
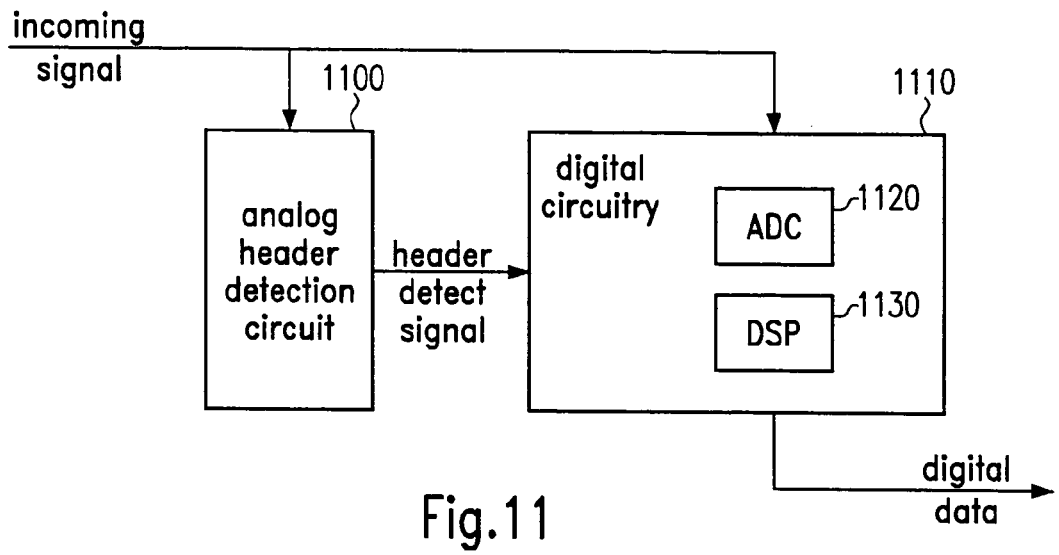
FIG. 11 is a block diagram illustrating the implementation of the header detection technique of the embodiments by analog circuitry.
Figure 12:
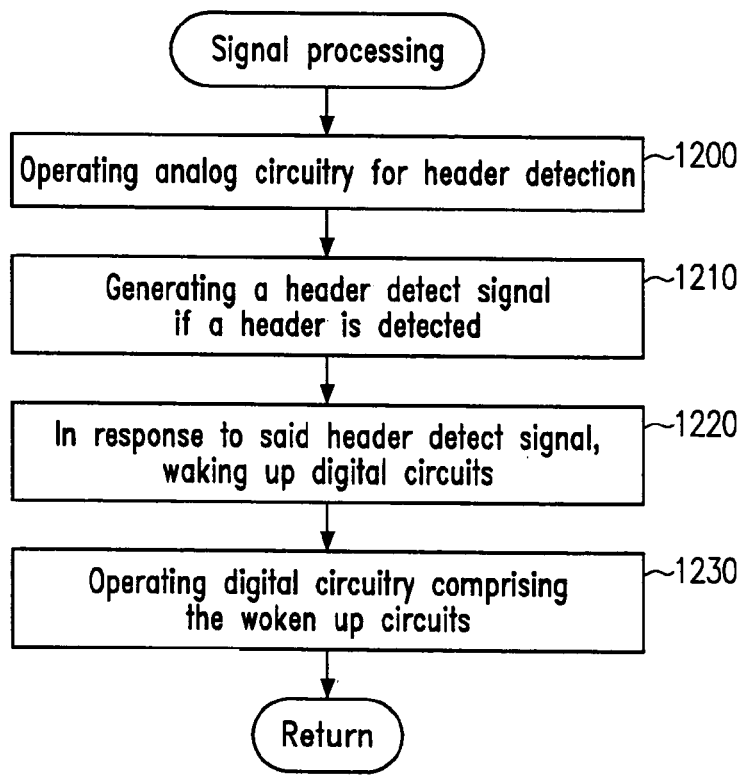
FIG. 12 is a flow chart illustrating a signal processing process including header detection according to an embodiment.

Turning now to FIG. 11, a high-level block diagram is illustrated showing that the WLAN receiver (or transceiver) of the embodiments comprises analog circuitry 1100 and digital circuitry 1110. The header detection units of the above-discussed embodiments are located in the analog part of an integrated circuit (IC), or on an analog (or radio) IC in case of a two-chip arrangement. The header detect signals HD and HD2 are provided to the digital circuitry 1110. The digital circuitry may inter alia comprise an Analog-to-Digital Converter (ADC) 1120 and a Digital Signal Processor (DSP) 1130.

As the header detection is performed in the analog circuitry part 1100, the header detection circuits of the embodiments may be used to wake up certain parts of the digital circuitry 1110 if a header is detected. In particular, the ADC 1120 and DSP 1130 may be woken up. This significantly reduces the power consumption of the WLAN receiver since these power consuming units need not be operated when there are no signals to process.

Thus, a header detection technique for WLAN signal packets is provided that allows for integration in the analog radio front-end. The header detection signal can be used to wake up more power consuming parts as the ADC 1120 and the DSP 1130. Furthermore, the header detection scheme of the embodiments may significantly reduce the false detection rate.

The circuits according to the embodiments may be realized by CMOS (Complementary Metal Oxide Semiconductor) technique.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A WLAN (Wireless Local Area Network) receiver for receiving incoming radio signals, said WLAN receiver comprising a signal processing unit for processing received signals, said signal processing unit comprising:
   analog circuitry for performing analog signal processing; and
   digital circuitry for performing digital signal processing, wherein said signal processing unit further comprises:
   a header detection circuit for detecting a header in a received signal,
   wherein said analog circuitry comprises said header detection circuit.

2. The WLAN receiver of claim 1, wherein said analog circuitry is connected to said digital circuitry to provide a header detect signal to said digital circuitry in case a header is detected.

3. The WLAN receiver of claim 2, wherein said digital circuitry is arranged to operate, at least in part, in two operational modes, one of said at least two operational modes being less power consuming than the other one of said operational modes, said digital circuitry being capable of switching between said operational modes in response to said header detect signal.

4. The WLAN receiver of claim 3, wherein said digital circuitry is a arranged to enter said other one of said at least two operational modes in response to said header detect signal.

5. The WLAN receiver of claim 3, wherein said digital circuitry operable in two operational modes comprises at least one analog-to-digital converter for converting received analog radio signals to digital signals.

6. The WLAN receiver of claim 3, wherein said digital circuitry operable in two operational modes comprises a digital signal processor.

7. The WLAN receiver of claim 1 being IEEE 802.11g compliant.

8. The WLAN receiver of claim 1, wherein said header detection circuit is adapted to detect OFDM (Orthogonal Frequency Division Multiplexing) headers.

9. The WLAN receiver of claim 1, wherein said header detection circuit is adapted to detect CCK (Complementary Code Keying) headers.

10. The WLAN receiver of claim 1, wherein said signal processing unit is CMOS (Complementary Metal Oxide Semiconductor) implemented.

11. The WLAN receiver of claim 1, wherein said header detection circuit comprises a delay line for delaying the incoming radio signals.

12. The WLAN receiver of claim 11, wherein said header detection circuit further comprises a mixer unit for mixing the incoming radio signals with the delayed incoming radio signals to generate an autocorrelated mixer output signal.

13. The WLAN receiver of claim 12, wherein said mixer output signal is a complex mixer output signal.

14. The WLAN receiver of claim 12, wherein said header detection circuit further comprises a first integrator to integrate said mixer output signal.

15. The WLAN receiver of claim 14, wherein said first integrator is a passive second order low pass filter.

16. The WLAN receiver of claim 14, wherein said header detection circuit further comprises a rectifier unit for generating a signal representative of the absolute value of said integrated mixer output signal.

17. The WLAN receiver of claim 16, wherein said header detection circuit further comprises a reference path for generating a reference power signal based on the incoming radio signal.

18. The WLAN receiver of claim 17, wherein said reference path comprises a second integrator having integration characteristics corresponding to the integration characteristics of said first integrator.

19. The WLAN receiver of claim 17, wherein said header detection circuit further comprises a first comparator for comparing said signal representative of the absolute value of said integrated mixer output signal with a weighted reference power signal.

20. The WLAN receiver of claim 19, wherein the reference power signal is weighted by a scaling factor of approximately one-half.

21. The WLAN receiver of claim 19, wherein said first comparator is arranged for outputting a first control signal if said signal representative of the absolute value of said integrated mixer output signal is equal to or larger than said weighted reference power signal.

22. The WLAN receiver of claim 21, wherein said header detection circuit is arranged to provide a header detect signal to said digital circuitry based on said first control signal.

23. The WLAN receiver of claim 22, wherein said header detection circuit further comprises a third integrator for integrating said signal representative of the absolute value of said integrated mixer output signal.

24. The WLAN receiver of claim 23, wherein said third integrator has a longer integration time than said first integrator.

25. The WLAN receiver of claim 24, wherein said reference path comprises a fourth integrator having integration characteristics corresponding to the integration characteristics of said third integrator.

26. The WLAN receiver of claim 25, wherein said header detection circuit further comprises a second comparator (for comparing said signal representative of the absolute value of said integrated mixer output signal with an output of said fourth integrator.

27. The WLAN receiver of claim 26, wherein said header detection circuit is arranged for providing said header detect signal also based on an output of said second comparator.

28. The WLAN receiver of claim 25, wherein said header detection circuit further comprises a third comparator for comparing an output of said third integrator with a weighted output of said fourth integrator to provide a second header detect signal.

29. The WLAN receiver of claim 28, wherein the output of said fourth integrator is weighted by the same scaling factor as used for weighting said reference power signal.

30. The WLAN receiver of claim 28, wherein said digital circuitry comprises a signal latching unit for latching said header detect signal and said second header detect signal, said signal latching unit having auto-reset capabilities.

31. The WLAN receiver of claim 30, wherein said header detection circuit is arranged to be reset in case of an AGC (Automatic Gain Control) reset.

32. The WLAN receiver of claim 30, wherein said header detection circuit is arranged to be reset when switching the WLAN receiver from a PLL (Phase Locked Loop) mode to a receiver mode.

33. The WLAN receiver of claim 1, wherein said header detection circuit is arranged to generate a header detect signal based on a first criterion and a second criterion, the first criterion defining that an autocorrelation value has to exceed a predefined fraction of the reception power, and the second criterion defining that the autocorrelation value has to exceed a predefined fraction of the integrated and delayed reception power.

34. The WLAN receiver of claim 1, wherein said incoming radio signal is a complex signal.

35. The WLAN receiver of claim 1, wherein said incoming radio signal is a bandpass signal.

36. The WLAN receiver of claim 35, wherein said header detection circuit comprises multiple autocorrelation stages each comprising a delay line and a mixer.

37. The WLAN receiver of claim 36, wherein said header detection circuit comprises a non-linear signal transformer between said autocorrelation stages.

38. An integrated circuit chip for processing signals received by a WLAN (Wireless Local Area Network) receiver, said integrated circuit chip comprising:
analog circuitry for performing analog signal processing; and
digital circuitry for performing digital signal processing, wherein said integrated circuit chip further comprises:
a header detection circuit for detecting a header in a received signal,
wherein said analog circuitry comprises said header detection circuit.

39. A method of operating a WLAN (Wireless Local Area Network) receiver for processing incoming radio signals comprising:
performing analog signal processing; and
performing digital signal processing,
wherein said method further comprises:
detecting a header in a received signal,
wherein performing said analog signal processing comprises said header detection.

* * * * *